United States Patent [19]

Colvin et al.

[11] Patent Number: 5,518,802
[45] Date of Patent: May 21, 1996

[54] CUSHIONING STRUCTURE

[76] Inventors: David P. Colvin, Rte. 5, Box 67, Apex, N.C. 27502; Craig S. Potter, 2632 Pleasant Union Church Rd., Raleigh, N.C. 27614

[21] Appl. No.: 178,265

[22] PCT Filed: Jun. 29, 1992

[86] PCT No.: PCT/US92/05533

§ 371 Date: Apr. 21, 1994

§ 102(e) Date: Apr. 21, 1994

Related U.S. Application Data

[63] Continuation-in-part of Ser. No. 830,181, Jan. 31, 1992, abandoned, which is a continuation-in-part of Ser. No. 723,576, Jul. 1, 1991, abandoned, which is a continuation-in-part of Ser. No. 359,105, May 31, 1989, Pat. No. 5,030,501.

[51] Int. Cl.$^6$ ..................... B32B 3/30
[52] U.S. Cl. .............. 428/178; 428/72; 428/166; 428/180; 428/304.4
[58] Field of Search ............ 428/178, 72, 166, 428/180, 304.4; 5/449, 451; 36/44

[56] References Cited

U.S. PATENT DOCUMENTS

| | | | |
|---|---|---|---|
| 2,275,575 | 3/1942 | Vrooman | 428/178 |
| 2,347,207 | 4/1944 | Margolin | 36/44 |
| 3,549,201 | 12/1970 | Wolfe | 5/449 |
| 4,422,194 | 12/1983 | Viesturs et al. | 5/451 |
| 4,619,055 | 10/1986 | Davidson | 36/44 |
| 5,030,501 | 7/1991 | Colvin et al. | 428/178 |

*Primary Examiner*—Archene Turner
*Attorney, Agent, or Firm*—Rosenthal & Putterman

[57] ABSTRACT

A cushioning structure for dampening shocks useful as a packing material to protect shipments of goods and as a protective shield or garment to prevent injury from falls or increase comfort such as in shoes, furniture, carpet, automobile components etc. including one or more planar sheets of pliable material bonded to a matrix of polygon shape cells containing a fluid such as air or other gas. In one aspect the cells are in fluid communication with each other to provide a valved fluid transfer from one cell to the next. In another aspect, the material is a resilient material formed as a grid like matrix of shaped indentures.

23 Claims, 7 Drawing Sheets

CUSHIONING STRUCTURE

REFERENCES

This application is a Continuation-In-Part in the United States of U.S. patent application Ser. No. 07/830,181 filed Jan. 31, 1992 now abandoned, having the same inventors and the same title CUSHIONING STRUCTURE. That application is a Continuation-In-Part of U.S. patent application Ser. No. 07/723,576 filed Jul. 1, 1991 now abandoned, having the same inventors and the same title CUSHIONING STRUCTURE which is a Continuation-In-Part of U.S. patent application Ser. No. 07/359,105 filed May 31, 1989 now issued U.S. Pat. No. 5,030,501.

FIELD OF THE INVENTION

This invention relates to a fluid inclusive, composite, cushioning structure in which a plurality of elements are formed to enclose a fluid that is responsive to outside impact forces and to reduce the damaging effects of such forces. More particularly, it relates to structures having pliable cells that are filled with air or other gaseous fluids to cushion impacts, such as air bubble and air bag devices, in which the air compresses under the forces of suddenly applied impact loads to resist the forces, thereby cushioning the load. Even more particularly, the internal flow of fluid is in a controlled manner to reduce the rebound of the impacting body.

BACKGROUND OF THE INVENTION

The general problems of damage caused by suddenly applied impact loads are well recognized. Such damages include breakage and destruction of property as well as injury to persons.

Because the occurrence of such impact loads is beyond the control of those who have a need to ship products in commerce by rail, truck, or air and other common carrier transportation, a most common approach to the problem is to provide packaging material and cushioning material in a position around the object in a shipping container to absorb the impacts before they have a damaging effect on the contents being shipped.

In a like manner, persons who are likely to be subjected to impacts either by falling or contact in sports such as football and other "contact" sports often employ cushioning materials in the form of padding to absorb the impacts.

Elderly persons are particularly susceptible to injury, primarily broken bones, through falls and sudden impacts. A major problem for the elderly, who are forming an increasing portion of the population, is susceptibility to broken bones from falls and sudden impacts. Persons of an advanced age find it very difficult to recover from such injuries, and broken hips and joints often lead to complications shortening life.

In still other instances some items or products regularly receive and resist impacts in their normal operation. For instance, the soles of shoes and the treads of tires or objects which repetitively receive impacts in normal operation. In recent years, so called "athletic" or "walking" shoes have been provided with soles and insoles that are thought to be helpful in cushioning the impacts of walking, jogging, and other strenuous endeavor. The cushioning structure of this invention is especially useful for this application.

In still other instances, design and construction efforts have been directed to cushioning the impacts of automobile collision with cushioning materials that are particularly light in weight but offer good cushioning performance if such impact collisions occur. Special materials in the framework of vehicles are provided for this purpose. The cushioning structure of this invention is especially useful for this application.

Because packing materials add to the weight and volume of the freight and objects being shipped, lightweight and compactness are objective features addressed by the prior art as well as many of the products presently in use. However, such objectives should be ideally sought without a reduction in the performance of the material. It is an object of the present invention to achieve a maximum capability for the absorption of impact and energy imparted to the material by the forces impacting on the structure with a minimum energy available for rebound. It is a further object to provide an improved ratio of material usage, material cost, and energy absorption by means of the unique form and geometrical shapes of the elements in the structure and their relation to each other. While prior practitioners have used some of the form and features of the present invention their unique combination presented herein has not been previously taught.

Although the prior art addresses many of the relevant factors that bear on the construction of an improved cushioning structure, none teach the unique form found in the cushioning structure of this invention.

SUMMARY OF THE INVENTION

In summary, this invention is a cushioning structure for dampening shocks comprising one or more planar stratum or sheets of pliable material having a plurality of cell structures bonded and sealed thereto with each cell structure comprising a polygon including a plurality of walls in upstanding relationship to the plane of the stratum. Each cell is closed and sealed at each end, with at least one end being one stratum, so that each cell structure comprises a sealed enclosure having a fluid therein. Each cell is connected to adjacent cells by way of a restricting airway that acts as a valve which can be varied during fabrication by adjusting the ratio of the cell volume to he cross-section of the connecting airway cross sectional area.

In a preferred embodiment, the structure includes two sheets of plastic material such as polyethylene or polyvinylethylene of a thin pliable compounding composition, with hexagonally shaped cells that are bonded to an overlay second sheet in such a way as to permit controlled airflow between adjacent cells. With the proper spacing of the hexagonal cells, two of the described assemblies can be meshed or mated together with the inside cells of one assembly nesting into the spaces between the cells of the second assembly. The cell walls are bonded to the outside sheets and communication means are provided between adjacent cells so that the air or gas may pass from one cell to the next when an impact force strikes a localized area on the surface of the structure and the air is restricted or slowed from re-entering the original cell in order to reduce the normal rebound.

In another embodiment, the invention includes a cushioning material structure of resilient material formed into the structure comprising: (a) a plurality of generally planar and opposing lateral sides, having a plurality of indentures formed in one or more of the opposing sides in the general configuration of a grid like surface on the sides; (b) the indentures are constructed in geometric shapes with walls of structural integrity resulting from their shape and arranged in a grid in repeating patterns that provide a continuum performance laterally throughout the structure.

Appropriate selection of material, wall thicknesses, and the connecting cross-sectional areas between the cells, provides the means for optimizing the performance of the structure in absorbing the energy of impact that is delivered to the surface of the material while minimizing the amount of rebound from the structure. By using an appropriately selected combination of different connecting cross-sectional areas throughout the structure, the resistance to different kinds and quantities of impacts can be provided to produce the desired deceleration.

The foregoing and other advantages of the invention will become apparent from the following disclosure in which preferred embodiments of the invention are described in detail and illustrated in the accompanying drawings. It is contemplated that variations and structural features and arrangement of parts may appear to the person skilled in the art, without departing from the scope of sacrificing any of the advantages of the invention which is delineated in the included claims.

DETAILED DESCRIPTION OF A PREFERRED EMBODIMENT OF THE BEST MODE OF CARRYING OUT THE INVENTION

The structure of this invention indicated generally as 19 includes an upper stratum or sheet of pliable material 20, and a lower stratum or sheet of pliable material 21 separated by a matrix of hexagonal, hollow three-dimensional polygon members 22 in juxtaposed or contacting relationship one to the next.

Figure 1:
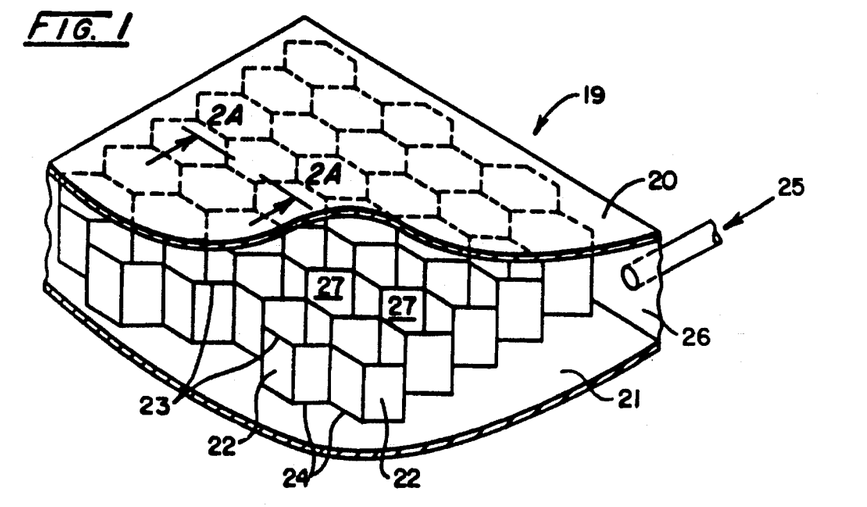
FIG. 1 is a partial schematic sectional perspective view of a portion of the structure of this invention.
Figure 2A:
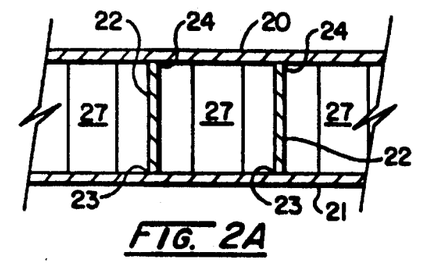
FIG. 2A is a partial elevational section view of the structure on the line 2A—2A of FIG. 1.

As shown in FIGS. 1 and 2A, the cell members 22 are of hexagonal shape in cross-sectional plan. In the finally assembled condition the edges 23 and 24 of the individual hexagonal cells 22 are bonded to the top stratum 20 and bottom stratum 21 at edges 23 at one side and at edges 24 at the opposite side, respectively. The bond formed at the edges 23 and 24 is a substantially hermetically sealed connection so that in the assembled condition the matrix includes a plurality of generally hexagonal cells 27 separately sealed one from the next, except as specifically otherwise provided and as hereafter defined.

Since the materials are heat sealable the various seals described herein may be accomplished by conventional heat sealing means. Adhesive could also be used.

The structure 19 is hermetically closed at the periphery by a closure means 26 and an inlet 25 is provided for the admission of a fluid such as air or other gas which may be at a pressure above surrounding atmosphere or environment in which the structure is placed. The structure 19 is constructed of generally pliable materials, usually plastics, including vinyl and/or polyethylene type films.

Dimensionally it is conceived that the structure 19 could be between about 1 and 30 centimeters "thick", i.e. the distance from the outside of one stratum to the other. The thickness of the sheet materials from which the strata 20 and 21 and matrix cells wall elements 22 are formed may be between about 0.01 and 100 mills.

In the embodiment shown in FIGS. 1 and 2A the matrix cells comprise hexagonal polygons. Such shape has been chosen because of the unique form of a hexagon that permits complete nesting of the vertical surfaces of the cell one to the next. Nevertheless, other forms of polygons may provide the advantages of this invention and are to be considered as within the concepts worthy of further evaluation and usefulness in the application of the principles that are embodied in the structure 19.

Figure 2B:
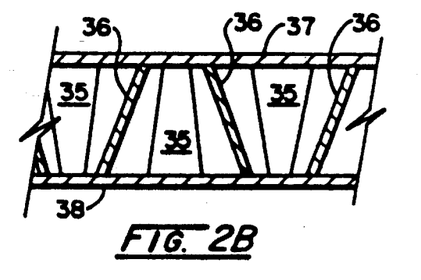
FIG. 2B is a partial elevational section view of another embodiment of this invention from the same position as FIG. 2A.

For instance, the contacting wall between polygons may be sloped rather than vertical, providing tapered or truncated polygons, rather than rectangular polygons as shown in FIG. 1. FIG. 2B shows tapered polygons as an example. In this embodiment a plurality of cells 35 have substantially upstanding sides 36 bonded to an upper planar sheet like stratum 37 and s similar lower stratum 38.

Figure 3A:
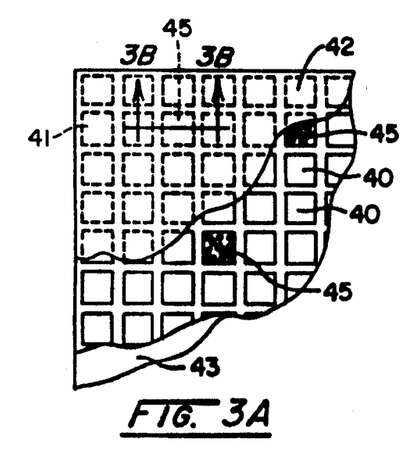
FIG. 3A is a partial schematic sectional plan view of a portion of another embodiment of the structure of this invention.
Figure 3B:
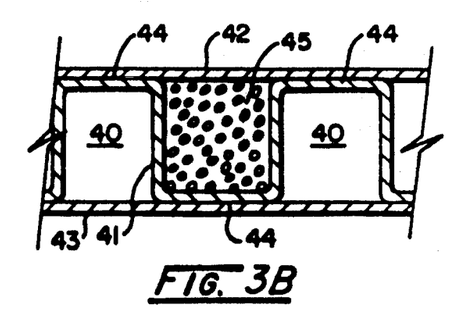
FIG. 3B is a partial elevational section view of a portion of the structure taken on the line 3B—3B of FIG. 3A.

Four sided polygons or cubes are representative of another polygon configuration that may be useful in some circumstances, as seen in FIGS. 3A and 3B.

In this embodiment a plurality of cells 40 are cube-like rectangles, formed or molded into an internal core member 41 (best shown in FIG. 3B). Core member 41 is bonded to an upper sheet 42 and a lower sheet 43 at positions of contact 44.

Still other forms of polygons are within ready conception, for instance, pentagons or cones.

Figure 4A:
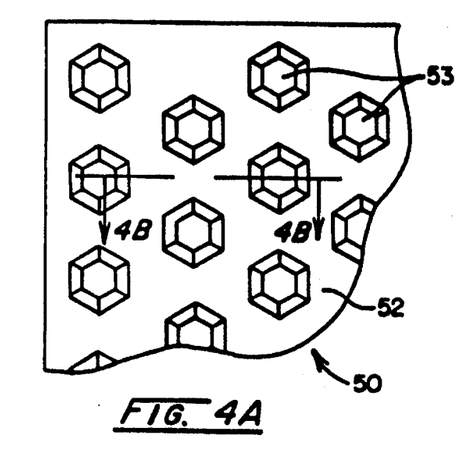
FIG. 4A is a partial plan view of another embodiment of this invention.
Figure 4B:
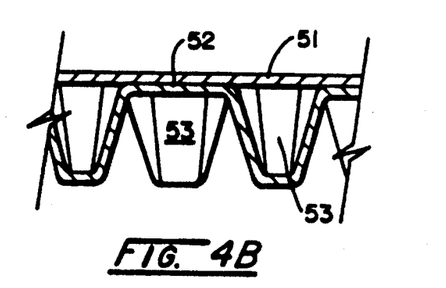
FIG. 4B is a partial elevational section view taken on the line 4B—4B of FIG. 4A.

Referring to FIGS. 4A and 4B a structure 50 includes an upper stratum 51 to which is bonded a lower cellular matrix 52 on which is formed a plurality of downstanding/upstanding truncated polygon cells 53 selectively arranged in mutually supporting and equally load distributing relationship across the surface of the stratum 51.

Figure 5:
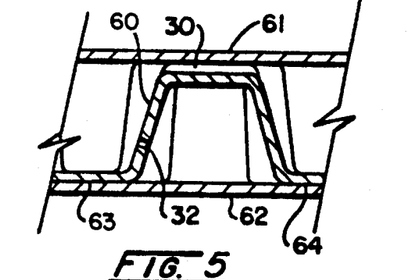
FIG. 5 is a sectional elevation view of another embodiment of the invention.

In another aspect of this invention as shown in FIG. 5, a passage way conduit or aperture 30 is provided from a polygon to each of the adjacent cells through which the fluid is conducted to pass from one cell to the next. By the proper selection of the size of such conduits, the rate of fluid flow may be controlled and serve to "valve" the rate of the fluid passage from one cell to the next. Such conduits 30 may be provided by allowing unbonded areas between the end of a cell 60 and the stratum 61. This controlled venting of the compressed air spring within the impacted cell serves to maximize the absorption of the impact energy while minimizing the energy available for rebound. The difference in pressure between the impacted and the unimpacted, adjacent cells aids the controlled reinflation of the impacted cell in order the provide protection from repeated impacts.

In the embodiment of FIG. 5, an internal matrix structure 60 is sandwiched between an upper stratum 61 and a lower stratum 62 and bonded there between at the surfaces 63 and 64.

Referring to FIG. 5, the internal matrix structure 61 is provided with substantially upstanding walls that may also be designed provide one-way valve-like apertures 32 between the walls of two mating hexagonal structures that aids the reduction of rebound energy. The apertures 32 open upon an impact due to the columnar buckling of the cell walls and pass fluid from the impacted area to adjacent areas when the pressure on the one side increases to a value higher than the pressure on the other side. When the pressure equalizes during the structural rebound, the resilience of the material in the member 61 causes the valved opening to close or partially close thereby restricting the reverse flow by allowing the pressure to gradually equalize.

Figure 6:
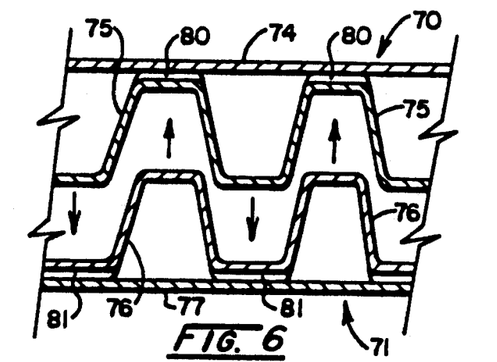
FIG. 6 is a partial elevational section view of another embodiment of this invention.
Figure 7:
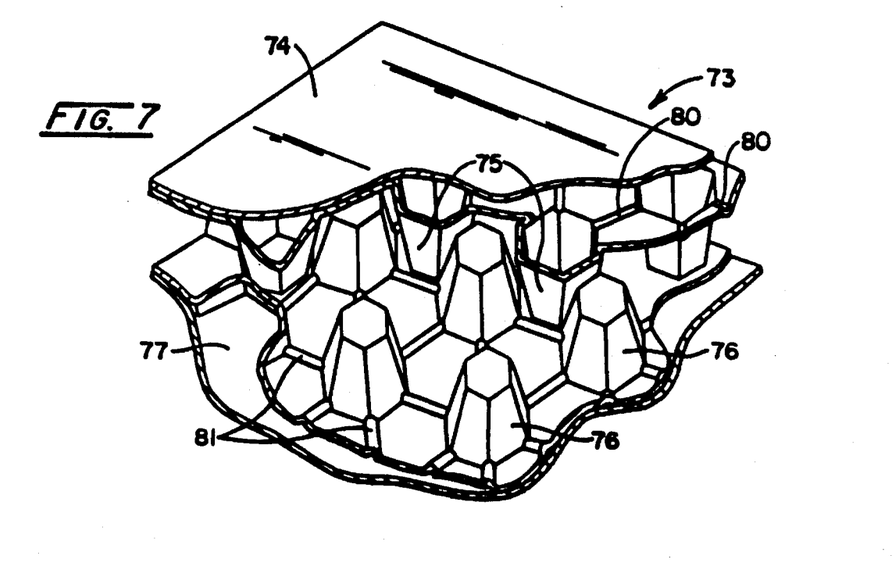
FIG. 7 is a partial schematic sectional perspective view of a portion of another embodiment of the structure of this invention.
Figure 7A:
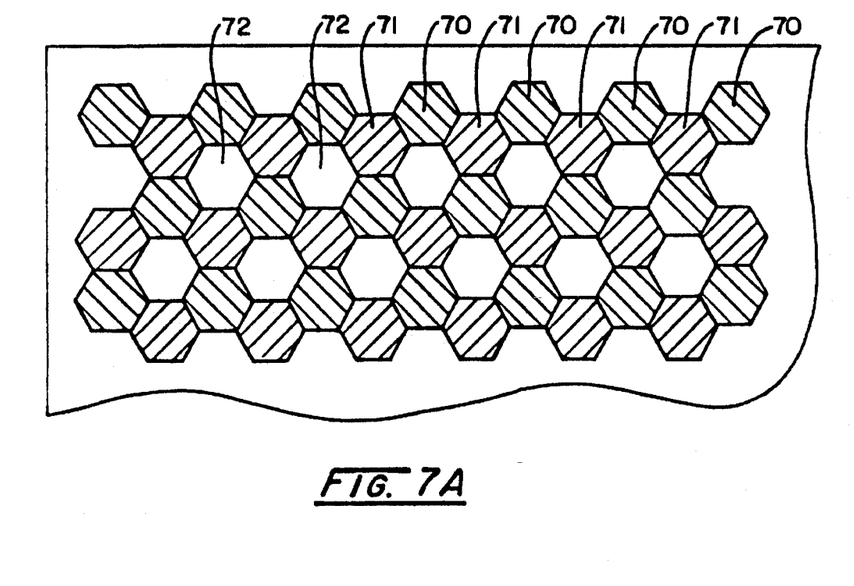
FIG. 7A is a schematic layout of the organization of the cells in the embodiment shown in FIG. 7.
Figure 8:
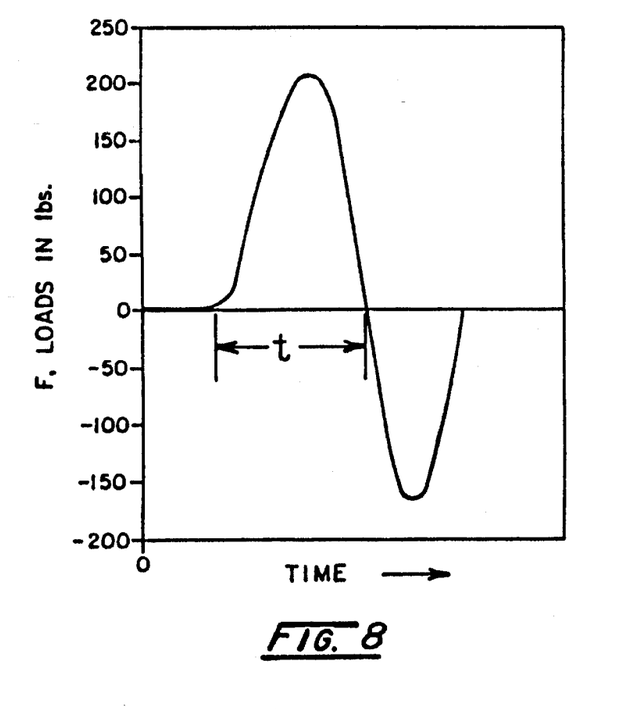
FIG. 8 is a typical load vs. time chart representative of an impact load upon an undamp cushioning structure.
Figure 9:
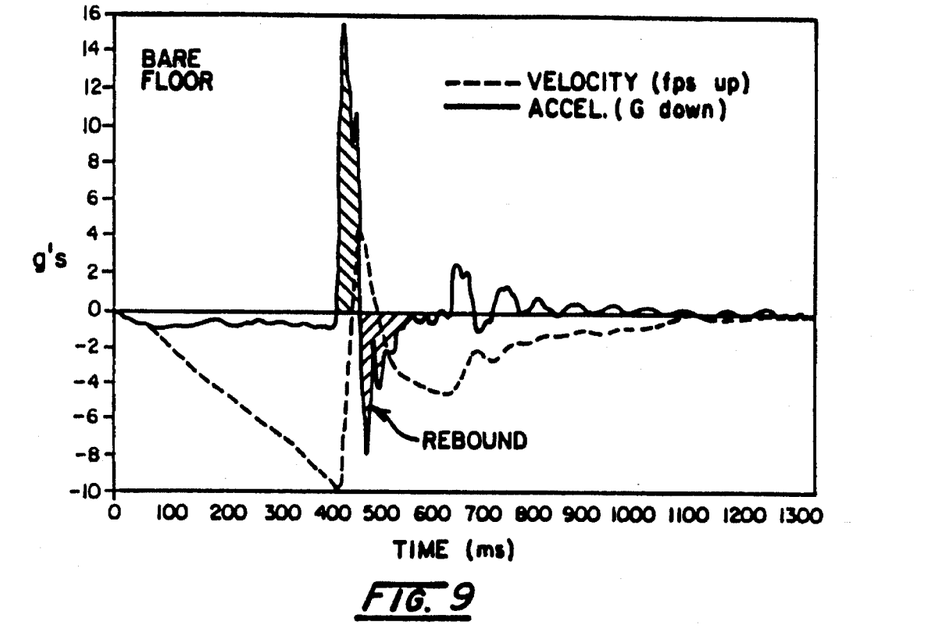
FIG. 9 is a graph showing the velocity and acceleration imparted to a test specimen in a standard test when no cushioning structure is provided between a bare floor and the specimen.
Figure 10:
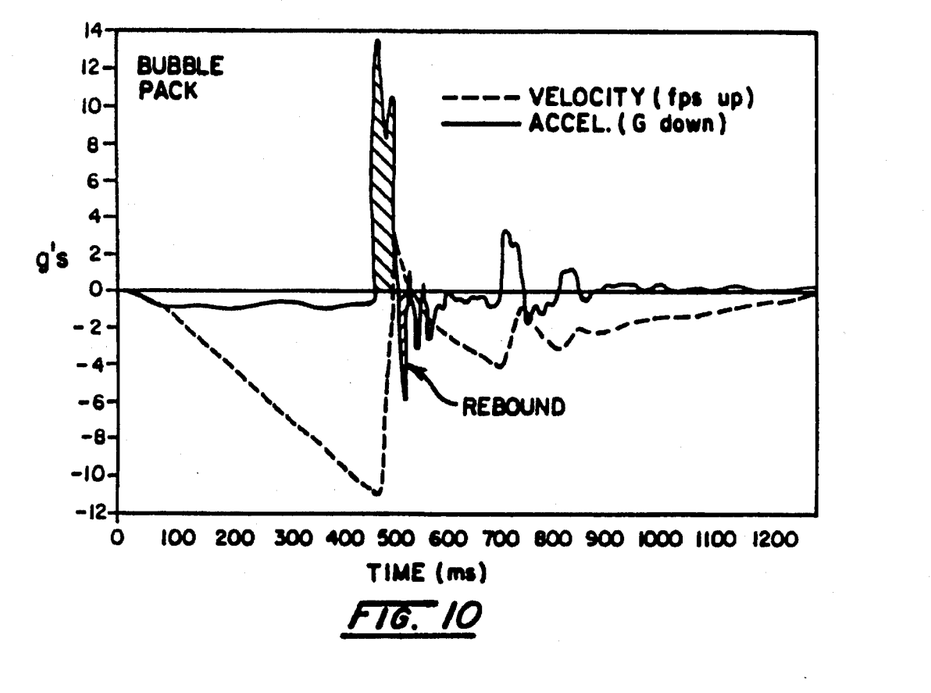
FIG. 10 is a graph showing velocity and acceleration imparted to a specimen dropped 36 inches upon a cushioning structure of 1 inch thick conventional commercial bubble pack.
Figure 11:
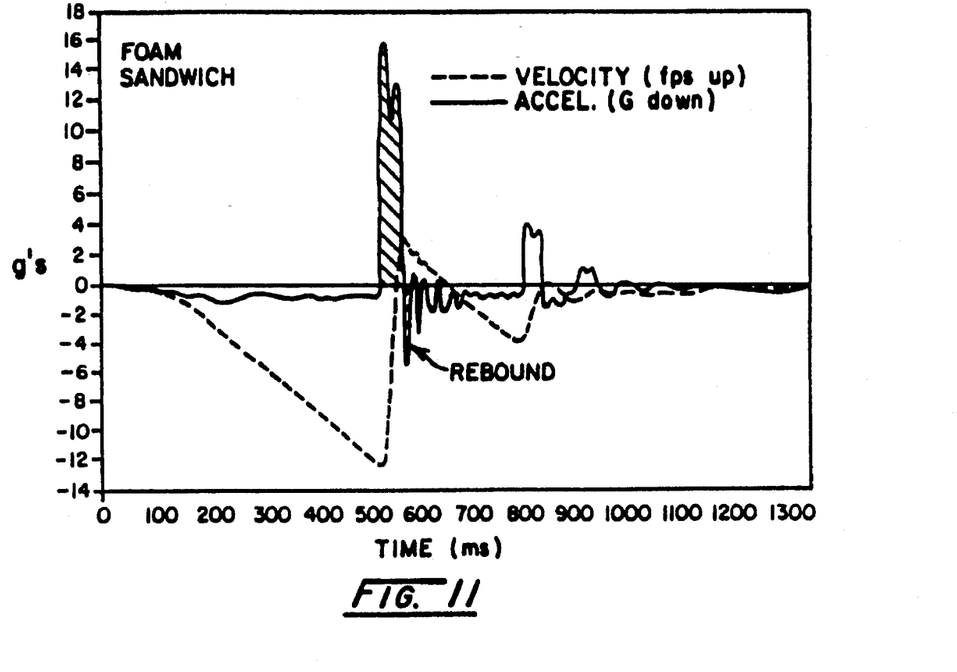
FIG. 11 is a graph showing velocity and acceleration of a specimen that was dropped 36 inches upon a conventional sandwich structure of dense elastic foam.

Referring to the FIGS. 6, 7 and 7A, in the further embodiment of the invention, separate substructures, indicated generally as 70 and 71 and constructed in accordance with the embodiment shown in FIGS. 4A and 4B, are brought together as shown by the arrows in FIG. 6 to form a composite structure 73. When so assembled the polygon cells of substructure 70 (See FIG. 7A) mate with polygon cells of substructure 71 leaving a plurality of empty cells 72.

In the assembled position as shown in FIG. 7 the composite structure 73 compresses an upper stratum 74, internal cell polygons 75, shown as truncated prismatic in shape because of the inherent columnar structural strength of such configuration, of the upper substructures 70, and internal polygon cells 76, of matching configuration to the polygons 75, of the lower substructure 71, as well as lower stratum 77.

Channels 80 of the upper substructure 70 and channels 81 of the lower substructure 71 provide the valving action and dampening action in composite structure 73.

By means of a combination of the columnar buckling of the supporting hexagonal walls, the restricted airflow through the connecting passages between the cells, and the valved airflow between mating structures, the rate is controlled at which the force of impact on the surface of the structure is dissipated throughout the structure and the energy available for rebound is minimized.

In use, structures 19, 50 and 73 are placed external to a fragile body or between a wall such as the side of a shipping carton, and an object such as a product to be shipped in commerce. It may be expected that the object will encounter sudden loads and impacts during the course of its shipment to its destination. Such impacts produce sudden loads on one side of the structure 19 and forces are created against one side stratum, which depend upon the amount of force and the area of the object that inputs on the surface. The reaction created in the structure 19 responds to the impact load by compressing the fluid through lateral pressure forces radiating from the place of impact from one cell to the next to disperse the load and reduce the force at a rate which prevents damage to the object.

In an alternative situation, the structure 19 may be formed as wearing apparel or padding for the projecting and more fragile components of a persons body. If the padding were worn as a pants or skirt about the hips of a person,and the person falls, the protruding hip joints are a load to which the structure 19 reacts.

Because of its unique construction and the lateral dispersal of the impact load, it had been found that the energy absorption of this structure exceeds prior art apparatus tested that are in use for these purposes. In actual tests the energy absorption has been found to be 30–100% higher than such packing materials as "bubble packs" or foam materials such as rubber or plastic foam materials that are presently in the marketplace for this purpose.

Referring again to FIG. 3A and 3B, in still another aspect of the invention, selected numbers and positioned cells are filled with foam type materials 45 to provide a further parameter of dampening attenuation and energy absorption reaction to the load as well as the restoration or recovery of the cushioning structure to its original or pre-impacted state.

It is believed that the further enhancement of the surprisingly outstanding results are provided by the damping by the fluid as its flow is restricted to adjacent cells, by the valve action between the mating hexagonal structures, and the strength and controlled columnar buckling produced by a the crumpling of the inherently strong polygon structures.

A prototype cushioning structure as shown in FIG. 7 according to this invention was constructed and tested in comparison with other well known cushioning materials such as commercially available bubble pack, which is a connected plurality of semi-spherical air cells similar to that shown in U.S. Pat. No. 4,287,250, and a foam sandwich comprising two layers of foam, manufactured by Dynamic Systems, Inc. In these tests an object in the shape of a manikin head weighing 7 pounds was dropped form a distance of 36 inches upon a structure as defined in Table I which is representative of the results.

TABLE I

FORCE-IMPULSE AND RESTITUTION

| | | | Acceleration | | e'- Restitution Coefficient |
|---|---|---|---|---|---|
| Impulse | | | Peak to | | (Energy Difference |
| FIG. No. | Test No. | Fall Description | Peak g's | lb-sec | Impactless Rebound) |
| 9 | 49 | Bare Floor | 360 | 282.3 | .65 |
| 10 | 72 | Bubble Pack | 360 | 321.5 | .5 |
| 11 | 65 | Foam Sandwich | 375 | 335.8 | .58 |
| 12 | 74 | Invention | 220 | 371.2 | .46 |

In Table I "peak to peak: is the value in g's ft/sec² per 32 ft/sec² of maximum force in one cycle from first impact to rebound.

The impulse is the force x time in pound/second and the restitution coefficient is the percent of rebound between the first impact and the first rebound. It is to be emphasized that the prototype unit was much lighter (25% of the density or weight of the sandwich foam) and only half its thickness. The packaging density of the invention is also significantly higher than conventional bubble pack, i.e. the material is molded into the series of hexagonal cells to provide a high strength/weight ratio and still can be easily sealed. Since the internal strength of the dividing members can be varied, the invention can also be made to support practically any weight and still provide good shock absorption protection—a feature of great importance to the shipping and packing industry. This structure is also compatible with traditional vacuum molding technology and thus is relatively inexpensive to mass produce. It is therefore apparent that there are significant commercial improvements in his cushioning structure as a lightweight, low bulk, high performance packaging material for shipping.

Further evidence of the improved energy absorption of this invention in comparison with other cushioning materials tested is shown in FIGS. 8–12, in which the area under the neutral axis "zero" for the invention and the depth of penetration of the rebound, as shown by the first rebound envelope (cross-hatched below the neutral axis) is drastically reduced in comparison with the other materials.

TABLE II

HEAD DROP ENERGY CALCULATIONS

| FIG. No. | Description | G Ave | G Peak | $Vi^2$ | $Vr^2$ | $\frac{Vi^2}{Vr}$ | KE Diff | Freq |
|---|---|---|---|---|---|---|---|---|
| 9 | Bare Floor | 9.71 | 15.45 | 198 | 106 | 1.87 | 9.93 | 4.57 |
| 10 | Bubble-Pack | 8.98 | 13.45 | 169 | 45 | 3.76 | 13.39 | 4.22 |
| 11 | Foam Sandwich | 10.85 | 16.15 | 269 | 48 | 23.87 | | 3.62 |
| 12 | Invention | 11.13 | 15.64 | 308 | 64 | 4.81 | 26.35 | 3.62 | where m = 7/32.2 = .217 slugs
vi = Velocity of Impact
vr = Velocity of Rebound
$(KE)_{(DIFF)} = \frac{m}{2} (vi^2 - Vr^2)$ ft-lb Further testing was conducted by GH Package/Product Testing and Consulting, Inc. of Cincinnati, Ohio according to standard ASTM (American Society of Testing Materials) criteria. In these tests the structure was subjected to vibration and impact shock testing to determine its viable characteristics as related to packaging. The vibration testing encompassed a 0.5 g input sign wave sweep with the cushioning structure of the invention loaded with incremental loadings from 0.11 psi to 0.17 psi. The results indicated a very low transmissibility characteristic to all testing frequencies with all loads. This characteristic for packaging protection is extremely beneficial in vibration protection since shifting psi loadings can be costly by requiring more cushioning material thereby increasing the volume and cost. Also, when wrapping material, the uniform vibration characteristics take place no matter what the results of loading in psi. In comparison to the vibration responses of a double thickness of bubble pack the cushioning material of this invention performs lower in transmissibility and much more consistent on all loads and frequencies.

The shock resistance characteristics produced by one thickness of the cushioning structure of the invention was typically greater than that generated by two thicknesses of conventional bubble pack. This was true across the various increased loadings that were impacted on the material.

Another important characteristic noted was that after the initial shock and rebound, the impact load incurred almost no additional secondary rebounds or almost negative g's. This indicates that a product which is packaged in the cushioning structure of this invention will not incur successive aftershock which may be more than damaging to sensitive products than the initial impact even though the initial impact even though the initial impact g's may result in large amplitudes.

Since the structure is more "efficient" (i.e. energy absorbing per unit of thickness) it would be useful in various other applications such as life jackets, baseball catcher protection, hockey equipment, football helmets, shoulder and chest protectors and seat cushions.

The prototypes of the invention were constructed to provide both a fast response and well regulated collapse while preventing the "bottoming out" of the structure. The invention presents a new and novel concept of distributed air cell venting and the controlled deformation of its internal structural members. Because of this combination, the wall thickness of the structure can be constructed to withstand a wide range of selected pre-loading. The pre-loading of the prototype unity was established to provide for less than ten pounds without premature collapse. This may be selectively increased in other cushioning structures by increasing the wall thickness of the cells and/or the orifices and cells. The energy absorption and rebound is regulated by the ventilation rate of the structure.

Referring to FIGS. 13–16, another embodiment of a cushioning structure 140 is shown including a formation of foamed resilient material 141. As shown the foamed material 141 is sandwiched between the plurality of two strata 142 and 143 respectively. The cushion material 141 is formed to include indentures 144.

In still another embodiment of the invention the cushion material 154 is formed to include indentures 144 on one side rather than on opposing sides. In this embodiment, shown in FIG. 18, the cushion material 154 may preferably be relatively smooth on the unindentured side 160 and comprises continuous foam except for the side that touches in contact with a stratum 142. In this embodiment the indentured side includes the passageways and the grid structure of the previous embodiments.

In some circumstances the cushion material 154 may be bonded to a structural component 155 of the object with which it is used, such as an insole or element of a shoe or a panel or door of an automobile. In this situation, the insole or structural element serves as the counterpart of the opposing stratum 155. The structure of this embodiment is different from the dual strata structure of FIG. 14, and is distinguished from an unsandwiched unindentured foam which has been conventionally provided as an insole in shoes.

The term "resilient material" 141, 154 is intended to include materials that by their internal structure have a resilience that tends to bring them back to their original formed shape when a load on them is removed (ie. elasticity). Such materials are often termed "foam" when the void space ratio is high relative to denser material, although denser materials may be "resilient" if they are elastic.

Figure 13:
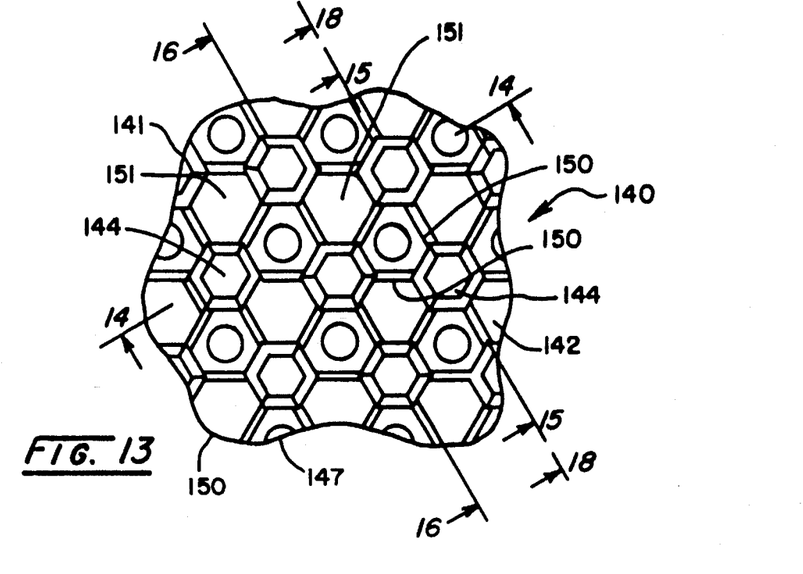
FIG. 13 is a plan view of one side of the cushioning structure of this invention with a transparent strata on the upper surface.

In FIG. 13 the upper stratum 142 is depicted as transparent so that the internal structure grid like configuration of the formed resilient cushioning material 141 may be discerned through the stratum 142.

The strata 142 and 143 may be of pliable or semi-pliable, or even rigid, material such as polymer, formulated to provide different degrees of flexibility, and other physical properties. The strata 142, 143 are bonded to the cushion material 141 by well-known conventional techniques including adhesive and heat sealing processes. The bonding may take place over the entire exposed surface 146 of the cushioning material 141 or it may be provided at intermittent points of contact between the surfaces.

When the structure is assembled the indentures form cells with molded interconnecting passageways, channels or conduits 150.

The indentures 144 are shown as truncated polygon in shape, because it is believed that these provide formations that have exceptional structural integrity. Other forms of indentures could be useful and selected depending on the parameters of performance that are to be provided by the total structure. Semispheres could be a useful form although their spacing would be less compact when the indentures are provided in a grid like mating relationship on opposite sides 146 of the foam cushioning material.

Figure 14:
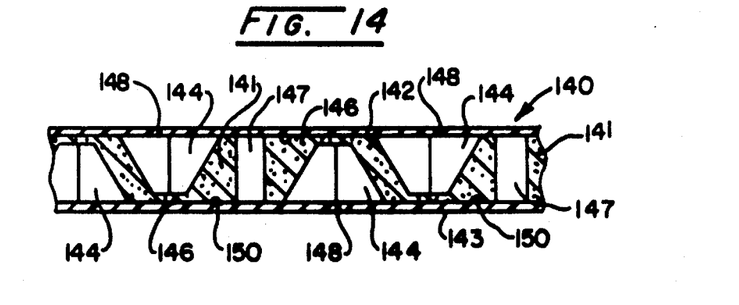
FIG. 14 is a sectional view through the composite assembled structure taken on the line 14—14 of the FIG. 13.

In the embodiment shown in FIGS. 13 and 14, a plurality of tube-like apertures 147 are provided that extend from one side 146 to the other side 46, and when constructed in the vertical orientation, as shown, provide further structural integrity support to the foamed cushioning material, and/or compressible fluid cells for their cushioning properties.

When the composite structural construction of the FIGS. 13–17 are bonded and sealed together, the indentures 144 and the apertures 147 comprise a plurality of cells for the containment of fluid, such as air, which may be pressurized at assembly or at ambient atmospheric presses as desired for the performance of the structure.

Figure 15:
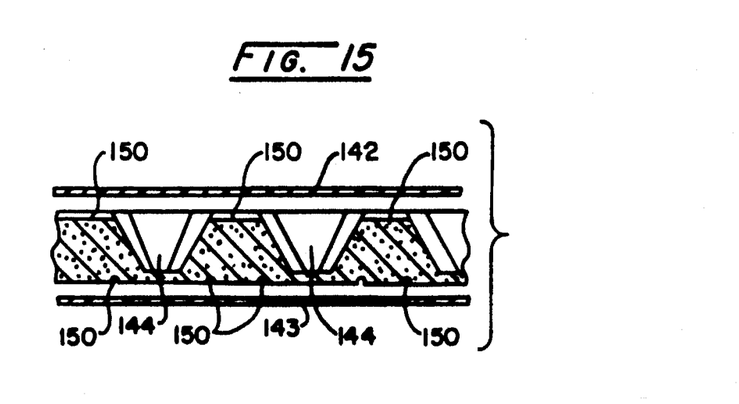
FIG. 15 is an exploded sectional view taken on the line 15—15 of FIG. 13.

Referring to FIGS. 13 and 15, of special significance are the passages 150 that provide fluid communication from one cell to the next, and function as the passages described with respect to previous embodiments such as FIGS. 5, 6 & 7. It has been found that the embodiments of the structure as shown in FIGS. 13–17 are the equivalent or superior in performance to that shown in FIG. 12.

Figure 17:
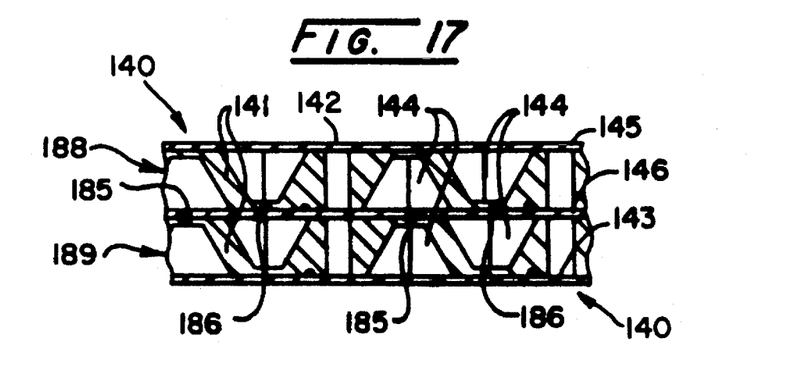
FIG. 17 is a sectional view of a typical multi layer composite structure taken on a line similar to FIG. 14.

Referring to FIG. 17, a structure comprising a plurality greater than two of stratum 140–143 and 145 are shown with a plurality of formed cushion material 141 bonded and sealed there between. In this embodiment, the benefits of the invention are additive although the amount of material for the equivalent performance is reduced.

Figure 16:
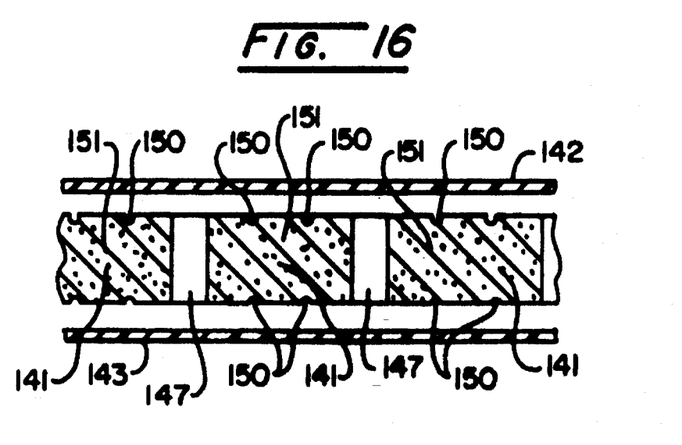
FIG. 16 is an exploded sectional view taken on the line 16—16 of FIG. 13.

As shown in FIGS. 13 and 16, the grid like matrix includes the plurality of relatively "solid" portions 151 as a further structural component.

Figure 12:
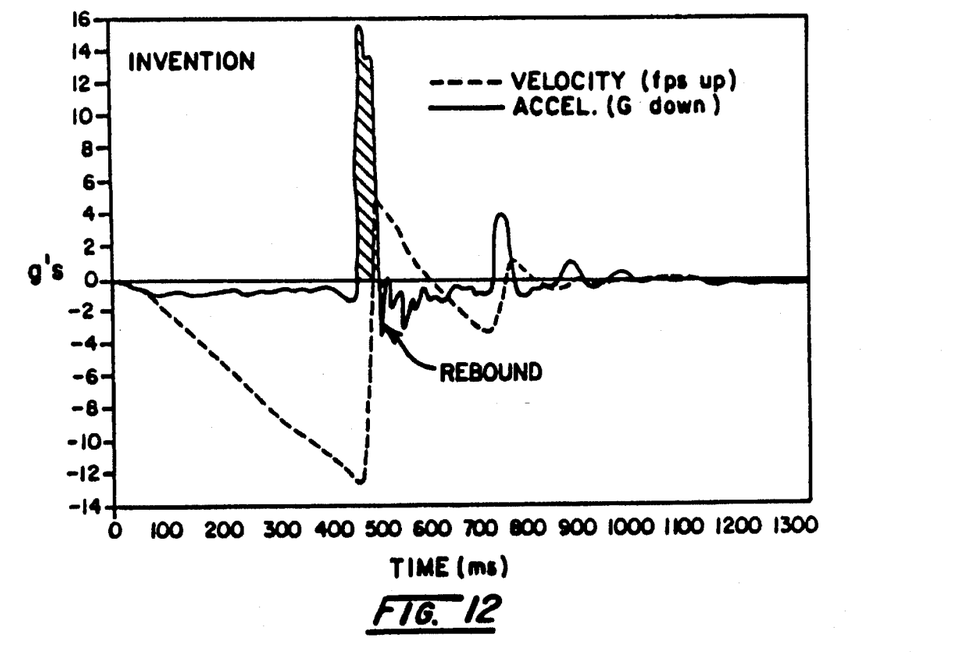
FIG. 12 is a graph showing velocity and acceleration of a specimen dropped upon the prototype cushioning structure of this invention from a height of 36 inches.

Referring further to FIG. 14, in another aspect it has been conceived that the strata 142 and 143 may be provided with small incontinuities, apertures or "pin-prick"-like perforations 148 which open when the strata 142 and 143 are stretched by an impact force on the structure. The perforations are constructed to perform like valves which open or close depending on the characteristics of the material of the strata, the thickness of the sheet and the pressure to which it is subjected upon impact. Such controlled venting in and out of the structure to the external atmosphere would be expected to provide a measure of damping, but is not believed to provide controlled rebound characteristics as shown in FIG. 12.

The pin prick flap type pressure relief and transfer system described in the previous paragraph may be embodied in the apparatus shown in FIG. 17 in which instance the aperatures 185 and the aperatures 186 provide exchange of fluid between the separate layers 188 and 189 to further provide fluid transfer means between the separate layers. This provides a further dampening effect in the "vertical Z direction", as distinguished from the "lateral X-Y direction", provided by the channels 150 and the valves-like aperatures 32.

Figure 18:
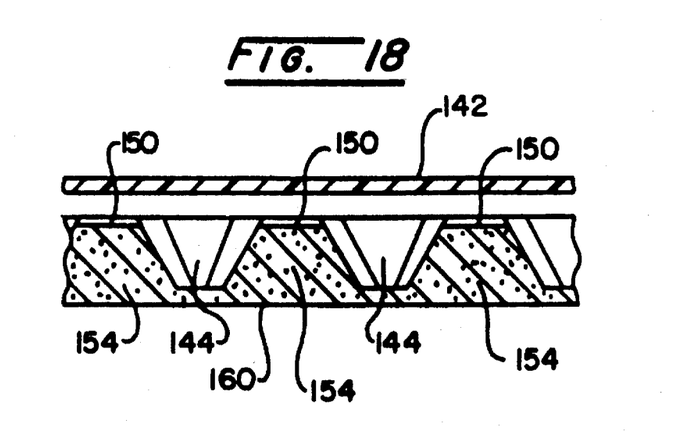
FIG. 18 is an exploded view of a cushioning structure similar to that shown in FIG. 15, but having only an upper strata.

Referring to FIG. 18, a structure similar to that disclosed in Figure is shown, except that only one strata 142 is bonded to the resilient material 154. Passages 150 provide fluid communication from one cell to the next, and function as the passages described with respect to the previous embodiments such as described in FIGS. 5, 6, 7 and 15.

It has been deemed important that the invention includes the ability for mass production and low cost.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

I claim:

1. A cushioning material structure of foamed resilient material of a structural form comprising:

(a.) a plurality of generally planar and opposing lateral sides, having a plurality of indentures formed in at least one of the opposing sides in the general configuration of a grid surface in the sides; and (b.) the indentures being in geometric shape with walls of structural integrity resulting from their shape and arranged in a grid in repeating patterns that provide a continuum of cushioning performance and structural support laterally throughout the structure, and (c.) wherein the space external of the indentures and between the opposing sides contains a resilient foam.

2. A cushioning structure according to claim 1 wherein the indentures include a plurality of tube apertures extending from one opposing side to the other opposing side.

3. A cushioning structure according to claim 1 wherein at least a portion of the indentures comprise a plurality of truncated prism forms; and further wherein the indentures also include a plurality of tube apertures extending from one opposing lateral side to the other opposing lateral side.

4. A cushioning structure for use in a surrounding atmosphere and for dampening impact shock loads that are suddenly applied, comprising:

(a.) a plurality of planar strata of pliable material having a plurality of cell/indenture structures bonded and sealed there between with each cell/indenture structure formed in a resilient material that includes a plurality of generally planar and opposing lateral sides, that are bonded to the planar strata to include a plurality of cell/indentures formed in the opposing lateral sides in the general configuration of a grid surface in the opposing lateral sides, (b.) the cell/indentures being in geometric shapes with walls of structural integrity resulting from their shape and arranged in a grid in repeating patterns that provide a continuum of cushioning performance laterally throughout the structure, and (c.) wherein the space external of the cell/indentures and between the opposing lateral sides contains a resilient foam.

5. A cushioning structure according to claim 4 wherein the cell/indentures include a plurality of tube apertures extending from one opposing lateral side to the other opposing lateral side.

6. A cushioning material according to claim 4 wherein the cell/indentures include a plurality of truncated prism forms; and wherein the cell/indentures include a plurality of tube apertures extending from one opposing lateral side to the other opposing lateral side.

7. A cushioning structure according to claim 5 wherein apertures to the external atmosphere are provided in the planar strata to provide a valving action in the passage of fluid from the said cell/indentures to the external atmosphere.

8. A cushioning structure according to claim 4 wherein the cell/indentures are formed in a geometric shape in a grid surface, and the cell/indentures are arranged in a substantially quadratic repeating patterns.

9. A cushioning structure according to claim 4 wherein the indentures are in the form of a polygon including a plurality of walls in substantially upstanding relationship of the plane of said planar sides and having a closed and sealed end in a position opposite to the said planar sides.

10. A cushioning structure indentures formed in one of the opposing sides in a general configuration of a grid surface in the side, (b.) the indentures being in geometric shapes with walls of structural integrity resulting from their shape and arranged in grid repeating patterns that provide a continuum of cushioning performance laterally throughout the structure, and (c.) wherein the space external of adjacent indentures and between opposing lateral sides contains a resilient foam.

11. A cushioning structure according to claim 4 wherein fluid passage means is provided between adjacent cell/indentures for the transfer of fluid and the pressure in one or more cell/indentures is increased as the result of impact shock loads upon the outer surface of a stratum and the amount of fluid communication between the cell/indentures is controlled at a preselected rate by a valving action of the passages for the fluid communication to provide a preselected dampening for a preselected range of shocks.

12. A cushioning structure according to claim 4 wherein the number of strata is two, one of which is bonded on each side of the cushioning material.

13. A cushioning structure according to claim 4 wherein the number of strata is greater than 2 and each strata has a foam bonded therebetween in a multi-layer sandwich.

14. A cushioning structure according to claim 4 wherein the cell/indentures are formed in a geometric shape in a grid surface, and the cell/indentures are arranged in substantially quadratic repeating patterns.

15. A cushioning structure according to claim 4 wherein the cell/indentures include a plurality of truncated prism forms; whenever they are included in the repeated quadratic pattern.

16. A cushioning structure according to claim 5 wherein fluid passage means is provided between adjacent cells/indentures for the transfer of fluid when the pressure in one or more cells/indentures is increased as the result of impact shock loads upon the outer surface of a stratum and the amount of fluid communication between the cells/indentures is controlled at a preselected rate by a valving action of the passages for the fluid communication to provide a preselected dampening for a preselected range of shocks.

17. A cushioning structure according to claim 1 wherein the indentures are in the form of a polygon including a plurality of walls in substantially upstanding relationship to the plane of said lateral sides and having a closed and sealed end in a position opposite to the said lateral sides.

18. In a cushioning structure according to claim 4 wherein the indentures are in the form of a polygon including a plurality of walls in substantially upstanding relationship to the plane of said lateral sides and having a closed and sealed end in a position opposite to the side sides.

19. A cushioning material structure of a resilient material of a structural form comprising:

(a) a plurality of generally planar and opposing lateral sides, having a plurality of indentures formed in one of the opposing lateral sides in a general configuration of a grid surface in the lateral side, (b) the indentures being in geometric shapes with walls of structural integrity resulting from their shape and arranged in a grid in repeating patterns that provide a continuum of cushioning performance laterally throughout the structure and (c) wherein the space external of the indentures and between the opposing lateral sides and the indentures contains a resilient foam.

20. A cushioning structure according to claim 19 wherein the indentures include a plurality of truncated prism forms.

21. A cushioning material according to claim 19 wherein the indentures include a plurality of tube apertures extending from one opposing lateral side to the other opposing lateral side.

22. A cushioning structure according to claim 19 wherein a portion of the indentures comprise a plurality of truncated prism forms; and wherein the indentures further include a plurality of tube apertures extending from one opposing lateral side to the other opposing lateral side.

23. A cushioning structure according to claim 19 wherein fluid passage means is provided between adjacent indentures for the transfer of a fluid in the indentures when the pressure in one or more indentures is increased as a result of impact shock loads upon the outer surface of a side and the amount of fluid communication between the indentures is controlled at a preselected rate by a valving action of the passage for the fluid communication to provide a preselected dampening for a preselected range of shocks.

* * * * *